US012661296B2

(12) United States Patent
Yeazel et al.

(10) Patent No.: US 12,661,296 B2
(45) Date of Patent: Jun. 23, 2026

(54) DEVICE AND METHOD OF MONITORING SAME

(71) Applicant: FRIGID FLUID COMPANY, Northlake, IL (US)

(72) Inventors: Brian Yeazel, River Forest, IL (US); Marcin Sobas, Mount Prospect, IL (US)

(73) Assignee: Frigid Fluid Company, Northlake, IL (US)

( * ) Notice: Subject to any disclaimer, the term of this patent is extended or adjusted under 35 U.S.C. 154(b) by 498 days.

(21) Appl. No.: 17/742,882

(22) Filed: May 12, 2022

(65) Prior Publication Data

US 2022/0366378 A1 Nov. 17, 2022

Related U.S. Application Data

(60) Provisional application No. 63/187,829, filed on May 12, 2021.

(51) Int. Cl.

| | |
|---|---|
| ***A61G 19/00*** | (2006.01) |
| ***B66C 13/04*** | (2006.01) |
| ***G07C 3/00*** | (2006.01) |

(52) U.S. Cl.

CPC .............. *A61G 19/00* (2013.01); *B66C 13/04* (2013.01); *G07C 3/00* (2013.01)

(58) Field of Classification Search

CPC ...... A61G 19/00; A61G 17/041; B66C 13/04; G07C 3/00; B66D 1/12; B66D 1/30; B66D 1/60; B66F 3/00; H04W 4/029; E04H 13/003; G06Q 10/20

See application file for complete search history.

(56) References Cited

U.S. PATENT DOCUMENTS

| | | | |
|---|---|---|---|
| 1,806,845 | A | 5/1931 | Dwyer |
| 2,118,704 | A | 5/1938 | Grontkowski |
| 2,163,172 | A | 6/1939 | Haase |
| 2,388,337 | A | 11/1945 | Moody |
| 2,462,617 | A | 2/1949 | Eckels |
| 2,560,450 | A | 7/1951 | Kaiser |
| 2,569,016 | A | 9/1951 | Mitchell |
| 2,693,254 | A | 11/1954 | Barish |
| 2,874,714 | A | 2/1959 | Pellerin |
| 3,086,621 | A | 4/1963 | Dale |

(Continued)

FOREIGN PATENT DOCUMENTS

| | | | |
|---|---|---|---|
| EP | 3221859 | B1 | 10/2020 |
| FR | 2923378 | A1 | 5/2009 |

(Continued)

OTHER PUBLICATIONS

USPTO; U.S. Appl. No. 17/742,850; Non-Final Rejection mailed Nov. 20, 2023; (pp. 1-7).

(Continued)

*Primary Examiner* — Angelica M McKinney

(74) *Attorney, Agent, or Firm* — Fitch, Even, Tabin & Flannery LLP

(57) ABSTRACT

A computer-implemented method, computer program product and computing system for: establishing wireless connectivity with a mortuary device; receiving status information from the mortuary device; and presenting the status information to a user.

30 Claims, 5 Drawing Sheets

(56) References Cited

U.S. PATENT DOCUMENTS

| | | | | |
|---|---|---|---|---|
| 3,090,095 | A | 5/1963 | William | |
| 3,095,066 | A | 6/1963 | Abplanalp, Jr. | |
| 3,419,945 | A | 1/1969 | Sawyer | |
| 3,507,207 | A | 4/1970 | Rogers | |
| 3,519,442 | A | 7/1970 | Blomgren | |
| 3,528,146 | A | 9/1970 | Armen | |
| 4,080,693 | A | 3/1978 | Pruitt | |
| 4,280,073 | A | 7/1981 | Miller | |
| 4,378,958 | A | 4/1983 | Mauldin | |
| 4,413,390 | A | 11/1983 | Blaese et al. | |
| 4,509,620 | A | 4/1985 | Verbos | |
| 4,582,187 | A | 4/1986 | Sekella | |
| 5,226,508 | A | 7/1993 | Ericson | |
| 5,697,132 | A | 12/1997 | Decarbo, Sr. | |
| 5,809,625 | A * | 9/1998 | Young | A61G 19/00 27/26 |
| 8,991,019 | B1 * | 3/2015 | Calvert | A61G 17/06 27/28 |
| 9,261,598 | B1 * | 2/2016 | Robinson | E04H 13/008 |
| 9,480,617 | B1 * | 11/2016 | Cook | E04H 13/00 |
| 11,248,847 | B1 * | 2/2022 | Buettgen | B66F 9/16 |
| 11,596,146 | B2 | 3/2023 | Bernaudo | |
| 11,957,630 | B2 * | 4/2024 | Yeazel | A61G 19/00 |
| 12,133,820 | B2 * | 11/2024 | Yeazel | G06Q 10/20 |
| 2003/0208890 | A1 * | 11/2003 | Kim | A62B 33/00 27/31 |
| 2007/0251526 | A1 * | 11/2007 | Zocher | A61M 16/1055 607/94 |
| 2012/0055740 | A1 | 3/2012 | Allington et al. | |
| 2012/0084953 | A1 | 4/2012 | Herridge | |
| 2012/0105237 | A1 * | 5/2012 | Kwong | G06Q 10/08 340/635 |
| 2012/0136196 | A1 * | 5/2012 | Foxall | G01R 33/3802 324/318 |
| 2014/0115843 | A1 | 5/2014 | Jenson | |
| 2015/0149367 | A1 * | 5/2015 | Thacker | A61G 17/041 705/307 |
| 2016/0275103 | A1 * | 9/2016 | Robinson | G06Q 10/087 |
| 2016/0335587 | A1 * | 11/2016 | Taylor | G06Q 20/14 |
| 2016/0378245 | A1 | 12/2016 | Montgomery et al. | |
| 2018/0251336 | A1 | 9/2018 | Garcia-Canales | |
| 2019/0382240 | A1 | 12/2019 | Schaeuble, Jr. | |
| 2020/0065719 | A1 * | 2/2020 | Takada | G06Q 10/08 |
| 2020/0173970 | A1 * | 6/2020 | Wilson | G01N 24/00 |
| 2020/0249906 | A1 * | 8/2020 | Maneman | A61G 17/04 |
| 2020/0263447 | A1 * | 8/2020 | Green | E04H 13/008 |
| 2021/0107708 | A1 | 4/2021 | Yeazel et al. | |
| 2021/0211608 | A1 * | 7/2021 | Greenberg | H04N 23/69 |
| 2022/0307284 | A1 * | 9/2022 | Schechter | E04H 13/003 |
| 2022/0362089 | A1 | 11/2022 | Yeazel | |
| 2022/0366378 | A1 | 11/2022 | Yeazel | |
| 2023/0414978 | A1 | 12/2023 | Burke | |
| 2024/0025712 | A1 | 1/2024 | Lagadec | |

FOREIGN PATENT DOCUMENTS

| | | | | |
|---|---|---|---|---|
| KR | 20220001073 | A * | 1/2022 | |
| WO | WO-2020026052 | A1 * | 2/2020 | G06Q 50/10 |
| WO | WO-2020083712 | A1 * | 4/2020 | |

OTHER PUBLICATIONS

International Search Report and Written Opinion issued in related Application Serial No. PCT/US2022/028966 on Aug. 16, 2022.
International Search Report and Written Opinion issued in related Application Serial No. PCT/US2022/028954 on Aug. 10, 2022.
International Search Report and Written Opinion issued in related Application Serial No. PCT/US2022/028961 on Aug. 10, 2022.
USPTO; U.S. Appl. No. 17/742,850; Notice of Allowance and Fees Due (PTOL-85) mailed Mar. 1, 2024; (pp. 1-7).
USPTO; U.S. Appl. No. 17/742,850; Notice of Allowance and Fees Due (PTOL-85) mailed Mar. 8, 2024; (pp. 1-4).
USPTO; U.S. Appl. No. 17/742,864; Final Rejection mailed Jul. 9, 2024; (pp. 1-12).
USPTO; U.S. Appl. No. 17/742,864; Non-Final Rejection mailed Feb. 26, 2024; (pp. 1-12).

* cited by examiner

DEVICE AND METHOD OF MONITORING SAME

RELATED APPLICATION(S)

This application claims the benefit of U.S. Provisional Application No. 63/187,829, filed on 12 May 2021, the entire contents of which are incorporated herein by reference.

TECHNICAL FIELD

This disclosure relates to devices and methods of monitoring the same and, more particularly, to mortuary devices and methods of monitoring the same.

BACKGROUND

Casket lowering system are utilized by cemetery personal to lower caskets into graves. These devices may be portable, thus allowing them to be transported to gravesites, where they are set up, utilized, and then broken down and removed. Often, these casket lowering systems are powered by household current (thus requiring the use of generators or extensions cords) or manually operated (thus requiring the use of hand cranks).

Unfortunately and due to the portable nature of these casket lowering systems, the immediate location of these systems may not be known or easily discernible. Further, the maintenance so such systems may often be overlooked due to e.g., the inability to accurately track usage.

SUMMARY OF DISCLOSURE

Status Monitoring System and Method

In one implementation, a computer-implemented method is executed on a computing device and includes: establishing wireless connectivity with a mortuary device; receiving status information from the mortuary device; and presenting the status information to a user.

One or more of the following features may be included. The status information may concern: the location of the mortuary device. The mortuary device may be powered by a rechargeable power source. The status information may concern one or more of: the charge state of the rechargeable power source; the charge cycles of the rechargeable power source; the age of the rechargeable power source; and the condition of the rechargeable power source. The mortuary device may include an embalming machine. The mortuary device may include a casket lowering device. The status information may concern: the quantity of lowering cycles of the casket lowering device. The casket lowering device may include an electrically-actuated brake assembly and the status information may concern the status of the electrically-actuated brake assembly. Maintenance information may be generated based, at least in part, upon the status information of the mortuary device. The maintenance information may be presented to the user. The maintenance information may include one or more of: maintenance recommendations concerning an electrically-actuated brake assembly; maintenance recommendations concerning a rechargeable power source; and maintenance recommendations concerning a casket support system.

In another implementation, a computer program product resides on a computer readable medium and has a plurality of instructions stored on it. When executed by a processor, the instructions cause the processor to perform operations including: establishing wireless connectivity with a mortuary device; receiving status information from the mortuary device; and presenting the status information to a user.

One or more of the following features may be included. The status information may concern: the location of the mortuary device. The mortuary device may be powered by a rechargeable power source. The status information may concern one or more of: the charge state of the rechargeable power source; the charge cycles of the rechargeable power source; the age of the rechargeable power source; and the condition of the rechargeable power source. The mortuary device may include an embalming machine. The mortuary device may include a casket lowering device. The status information may concern: the quantity of lowering cycles of the casket lowering device. The casket lowering device may include an electrically-actuated brake assembly and the status information may concern the status of the electrically-actuated brake assembly. Maintenance information may be generated based, at least in part, upon the status information of the mortuary device. The maintenance information may be presented to the user. The maintenance information may include one or more of: maintenance recommendations concerning an electrically-actuated brake assembly; maintenance recommendations concerning a rechargeable power source; and maintenance recommendations concerning a casket support system.

In another implementation, a computing system includes a processor and memory is configured to perform operations including: establishing wireless connectivity with a mortuary device; receiving status information from the mortuary device; and presenting the status information to a user.

One or more of the following features may be included. The status information may concern: the location of the mortuary device. The mortuary device may be powered by a rechargeable power source. The status information may concern one or more of: the charge state of the rechargeable power source; the charge cycles of the rechargeable power source; the age of the rechargeable power source; and the condition of the rechargeable power source. The mortuary device may include an embalming machine. The mortuary device may include a casket lowering device. The status information may concern: the quantity of lowering cycles of the casket lowering device. The casket lowering device may include an electrically-actuated brake assembly and the status information may concern the status of the electrically-actuated brake assembly. Maintenance information may be generated based, at least in part, upon the status information of the mortuary device. The maintenance information may be presented to the user. The maintenance information may include one or more of: maintenance recommendations concerning an electrically-actuated brake assembly; maintenance recommendations concerning a rechargeable power source; and maintenance recommendations concerning a casket support system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
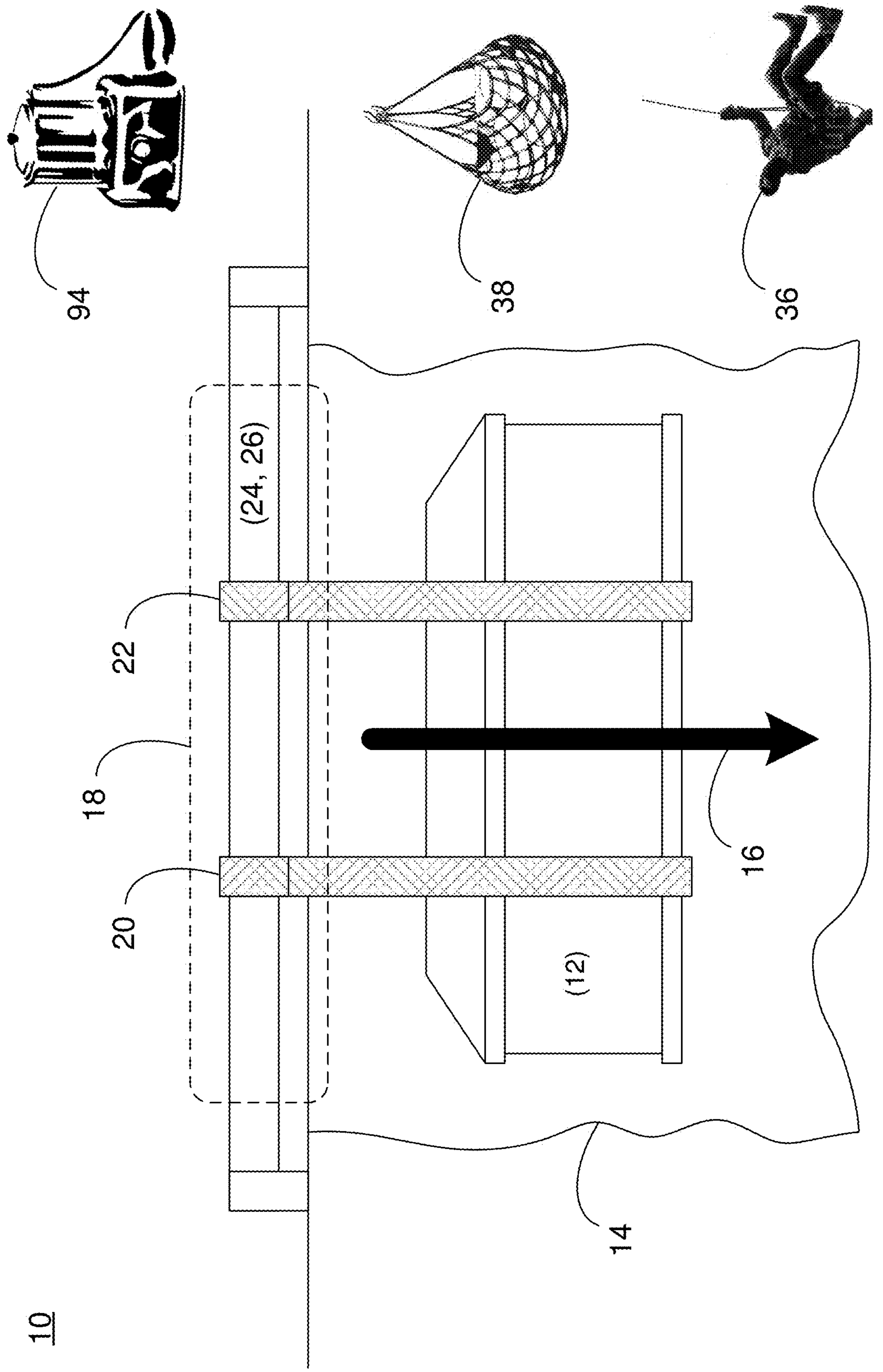
FIG. 1 is a side view of a casket lowering system according to an embodiment of the present disclosure.
Figure 2:
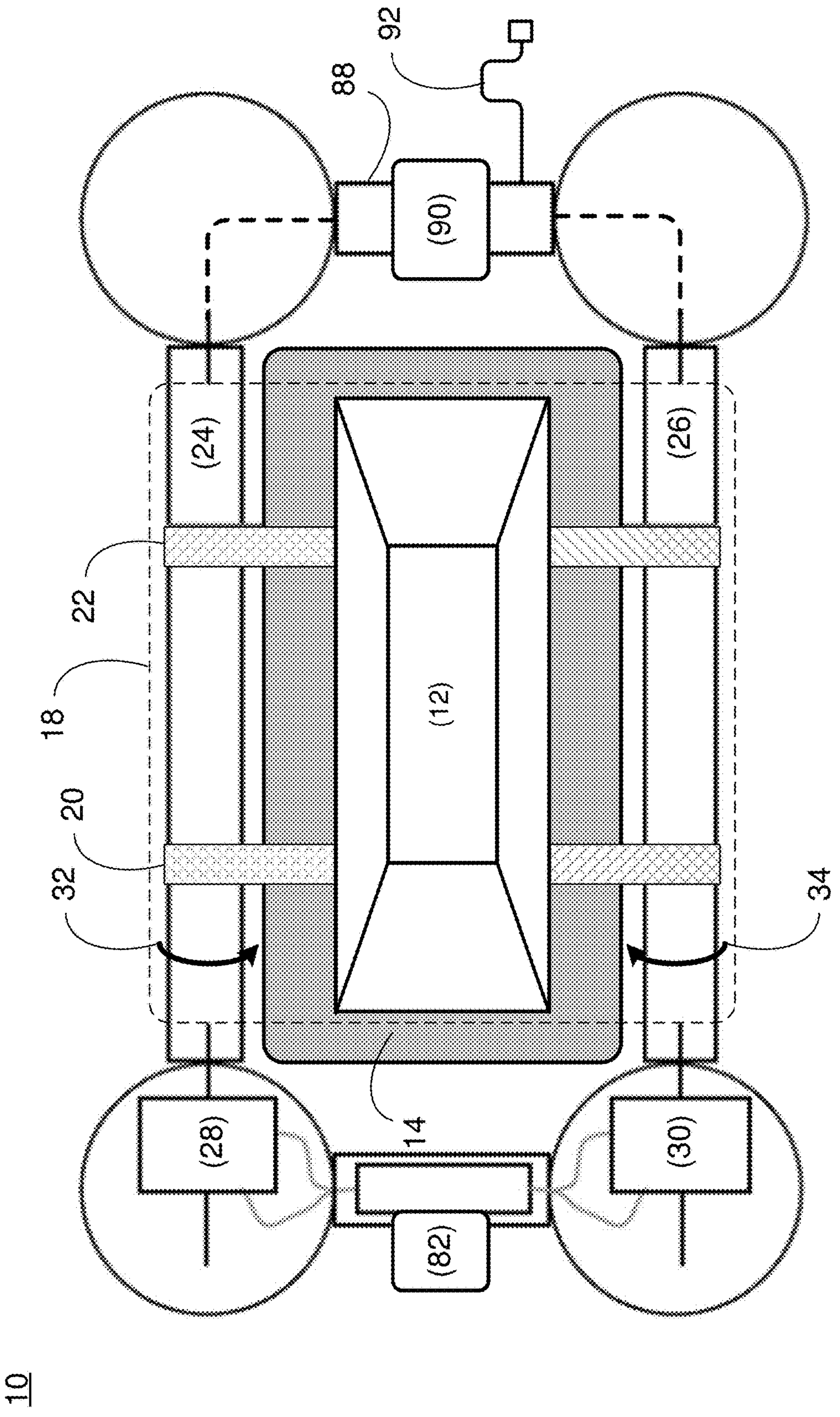
FIG. 2 is a top view of the casket lowering system of FIG. 1 according to an embodiment of the present disclosure.

Referring to FIGS. 1-2, there is shown casket lowering system 10 configured to enable the lowering of a casket (e.g., casket 12) into a grave (e.g., grave 14). Casket lowering system 10 may be configured to be easily transportable from gravesite to gravesite. For example, cemetery workers (not shown) may first dig a grave (e.g., grave 14) and then casket lowering system 10 may be positioned above grave 14. The casket (e.g., casket 12) may then be placed onto casket lowering system 10 so that it may be lowered (in the direction of arrow 16) into grave 14. Casket lowering system 10 may be constructed of any material that provides the requisite level of strength, while being light enough to be transportable (e.g., aluminum, composite plastic, carbon fiber).

Casket Lowering System

Casket lowering system 10 may include a casket support system (e.g., casket support system 18) configured to support the casket (e.g., casket 12) and temporarily suspend the casket (e.g., casket 12) above the grave (e.g., grave 14). The casket support system (e.g., casket support system 18) may include a plurality of strap assemblies (e.g., strap assemblies 20, 22). The plurality of strap assemblies (e.g., strap assemblies 20, 22) may be constructed of any material that provides the requisite level of strength and flexibility (e.g., nylon, canvas). Additionally, the casket support system (e.g., casket support system 18) may include one or more spool assemblies (e.g., spool assemblies 24, 26) around which the plurality of strap assemblies (e.g., strap assemblies 20, 22) are wound.

Casket lowering system 10 may include an electrically-actuated brake assembly coupled to the casket support system (e.g., casket support system 18) and configured to control the rate of descent of the casket support system (e.g., casket support system 18) into the grave (e.g., grave 14). In this particular embodiment, the electrically-actuated brake assembly is shown to include two discrete electrically-actuated brake assemblies (e.g., electrically-actuated brake assemblies 28, 30), wherein (in this particular example) electrically-actuated brake assembly 28 is shown to be coupled to (and therefore control) spool assembly 24, while electrically-actuated brake assembly 30 is shown to be coupled to (and therefore control) spool assembly 26. However, this is for illustrative purpose only, as other configurations are possible and are considered to be within the scope of this disclosure. For example, a single electrically-actuated brake assembly may be coupled to and utilized to control both of spool assemblies 24, 26.

As casket (e.g., casket 12) is positioned on the strap assemblies (e.g., strap assemblies 20, 22) of casket support system (e.g., casket support system 18) and the strap assemblies (e.g., strap assemblies 20, 22) are wound around spool assemblies 24, 26, in the event that spool assemblies 24, 26 are allowed to freely rotate (e.g., in the direction of arrows 32, 34 respectively), gravity will pull casket 12 downward (in the direction of arrow 16) into grave 14.

Accordingly and through the use of electrically-actuated brake assemblies 28, 30, the rotation of spool assemblies 24, 26 (and, therefore, the unwinding of strap assemblies 20, 22) may be controlled. Further and by modulating the rate at which spool assemblies 24, 26 are allowed to rotate (e.g., in the direction of arrows 32, 34 respectively), the rate at which strap assemblies 20, 22 unwind may be controlled, thus allowing for the controlling of the rate of descent of casket 12 into grave 14.

Accordingly, the electrically-actuated brake assembly (e.g., electrically-actuated brake assemblies 28, 30 in this illustrative example) may be configured to control the rate of descent of casket 12 into grave 14. However and while this particular example concerns controlling the rate of descent of casket 12 into grave 14, this is for illustrative purposes only and is not intended to be a limitation of this disclosure, as other configurations are possible and are considered to be within the scope of this disclosure.

For example, the electrically-actuated brake assembly (e.g., electrically-actuated brake assemblies 28, 30 in this illustrative example) may be configured to control the rate of descent of a repeller (e.g., repeller 36). For example, such an electrically-actuated brake assembly (e.g., electrically-actuated brake assemblies 28, 30 in this illustrative example) may be configured to control the rate at which people (e.g., EMTs, search & rescue personnel, military personnel) repel from e.g., a helicopter (not shown).

Additionally/alternatively, the electrically-actuated brake assembly (e.g., electrically-actuated brake assemblies 28, 30 in this illustrative example) may be configured to control the rate of descent of a static load (e.g., static load 38). For example, such an electrically-actuated brake assembly (e.g., electrically-actuated brake assemblies 28, 30 in this illustrative example) may be configured to control the rate at which cargo (e.g., food, supplies, medicine, weapons) may be lowered from e.g., a helicopter (not shown).

Figure 3:
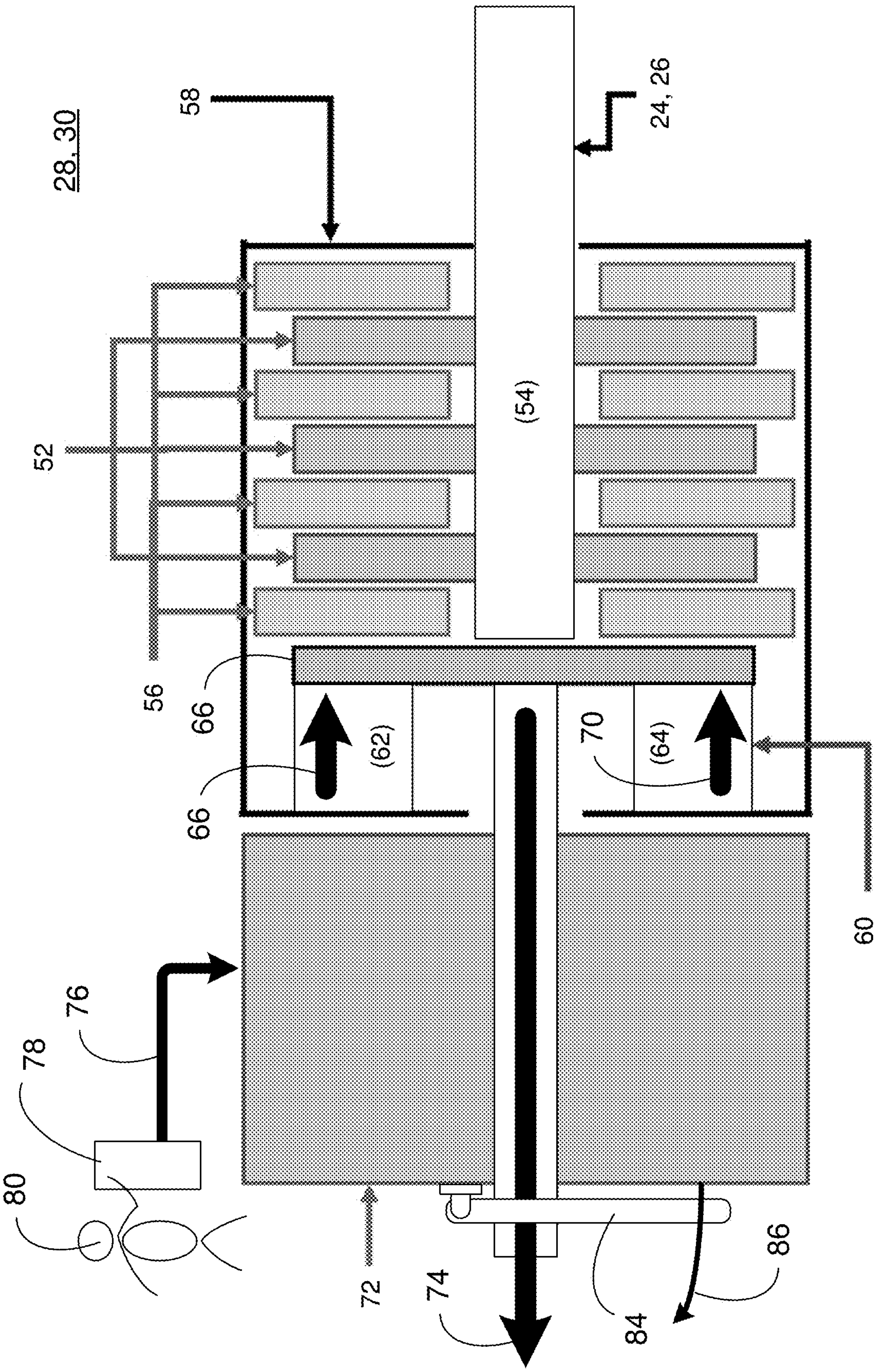
FIG. 3 is a diagrammatic view of an electrically-actuated brake assembly according to an embodiment of the present disclosure.

Referring also to FIG. 3, the electrically-actuated brake assembly (e.g., electrically-actuated brake assemblies 28, 30 in this illustrative example) may include one or more rotatable surfaces (e.g., rotatable surfaces 52) coupled to the object to be lowered (e.g., casket 12 into grave 14). For example, rotatable surfaces 52 may be disk assemblies covered with a high friction material (such as the friction material found on automotive brake pads), wherein rotatable surfaces 52 may be coupled to rotatable shaft 54. Rotatable shaft 54 may be coupled to spool assemblies 24, 26, which (as discussed above) control the unwinding of strap assemblies 20, 22 and, therefore, the lowering of casket 12 into grave 14.

The electrically-actuated brake assembly (e.g., electrically-actuated brake assemblies 28, 30 in this illustrative example) may also include one or more stationary surfaces (e.g., stationary surfaces 56) configured to releasably engage the one or more rotatable surfaces (e.g., rotatable surfaces 52). For example, stationary surfaces 56 may be disk assemblies covered with a high friction material (such as the friction material found on automotive brake pads), wherein stationary surfaces 56 may be coupled to housing assembly 58 of the electrically-actuated brake assembly (e.g., electrically-actuated brake assemblies 28, 30 in this illustrative example). As stationary surfaces 56 (in this example) are coupled to housing assembly 58 of the electrically-actuated brake assembly (e.g., electrically-actuated brake assemblies 28, 30 in this illustrative example), stationary surfaces 56 do not rotate.

The one or more rotatable surfaces (e.g., rotatable surfaces 52) and the one or more stationary surfaces (e.g., stationary surfaces 56) may be configured to be normally engaged via a mechanical engagement system (e.g., mechanical engagement system 60). An example of such a mechanical engagement system (e.g., mechanical engagement system 60) may include but is not limited to spring-based mechanical engagement systems (e.g., spring-based mechanical engagement systems 62, 64). In this particular embodiment, spring-based mechanical engagement systems 62, 64 may be coupled (on a first end) to housing assembly 58 of the electrically-actuated brake assembly (e.g., electrically-actuated brake assemblies 28, 30 in this illustrative example) and (on a second end) to plate assembly 66. Accordingly, spring-based mechanical engagement systems 62, 64 may be configured to bias plate assembly 66 in the direction or arrows 68, 70 (respectively), thus compressing the various rotatable surfaces (e.g., rotatable surfaces 52) and stationary surfaces (e.g., stationary surfaces 56) together, thus preventing the rotation of rotatable surfaces 52 (as rotatable surfaces 52 are in contact with/locked to stationary surfaces 56, which are coupled to housing assembly 58 of the electrically-actuated brake assembly (e.g., electrically-actuated brake assemblies 28, 30 in this illustrative example). Accordingly, electrically-actuated brake assembly (e.g., electrically-actuated brake assemblies 28, 30 in this illustrative example) may be a friction-based, electrically-actuated brake assembly.

The electrically-actuated brake assembly (e.g., electrically-actuated brake assemblies 28, 30 in this illustrative example) may include an electric actuator system (e.g., electric actuator system 72) configured to selectively disengage the one or more stationary surfaces (e.g., stationary surfaces 56) from the one or more rotatable surfaces (e.g., rotatable surfaces 52), thus allowing the one or more rotatable surfaces (e.g., rotatable surfaces 52) to rotate with respect to the one or more stationary surfaces (e.g., stationary surfaces 56) and enable the object to be lowered (e.g., the lowering of casket 12 into grave 14). An example of electric actuator system 72 may include but is not limited to a solenoid-based, electric actuator system.

The electric actuator system (e.g., electric actuator system 72) may be configured to overcome the mechanical bias (in the direction or arrows 68, 70) of the mechanical engagement system (e.g., mechanical engagement system 60). For example and when actuated, the electric actuator system (e.g., electric actuator system 72) may apply mechanical bias (in the direction of arrow 74), wherein this mechanical bias (in the direction of arrow 74) may be of sufficient force to overcome the mechanical bias (in the direction or arrows 68, 70) of the mechanical engagement system (e.g., mechanical engagement system 60). Further and by modulating the mechanical bias (in the direction of arrow 74) applied by electric actuator system 72, the rotational speed of rotatable shaft 54 (and, therefore, spool assemblies 24, 26) may be modulated (anywhere between locked/no rotation to free-wheeling).

Accordingly and through the use of electric actuator system 72, electrically-actuated brake assembly (e.g., electrically-actuated brake assemblies 28, 30 in this illustrative example) may be an electromagnetic-based, electrically-actuated brake assembly, wherein electrically-actuated brake assembly (e.g., electrically-actuated brake assemblies 28, 30 in this illustrative example) may be configured to receive an input signal (e.g., input signal 76) that controls the rate of descent of an object (e.g., casket 12 into grave 14). Input signal 76 may be a fixed signal that is intended to lower the object (e.g., casket 12 into grave 14) at a fixed rate or a variable signal that is intended to lower the object (e.g., casket 12 into grave 14) at a variable rate. Input signal 76 may be provided by hand controller 78 usable by user 80.

The electrically-actuated brake assembly (e.g., electrically-actuated brake assemblies 28, 30 in this illustrative example) may include a rechargeable power source (e.g., rechargeable power source 82) electrically coupled to the electric actuator system (e.g., electric actuator system 72) and/or the electrically-actuated brake assembly (e.g., electrically-actuated brake assemblies 28, 30 in this illustrative example) and configured to provide electrical energy to the same (e.g., electric actuator system 72 and/or electrically-actuated brake assemblies 28, 30). An example of such a rechargeable power source (e.g., rechargeable power source 82) may include but is not limited to a detachable battery assembly (e.g., a lithium-ion battery pack).

The electrically-actuated brake assembly (e.g., electrically-actuated brake assemblies 28, 30 in this illustrative example) may include a manual release assembly (e.g., manual release assembly 84). An example of manual release assembly 84 may include but is not limited to a lever that (when actuated in the direction of arrow 86) moves plate assembly 66 in the direction of arrow 74, thus disengaging the various rotatable surfaces (e.g., rotatable surfaces 52) from the stationary surfaces (e.g., stationary surfaces 56), thus allowing the rotation of rotatable surfaces 52 and rotatable shaft 54. As rotatable shaft 54 (in this example) is coupled to spool assemblies 24, 26, which (as discussed above) control the unwinding of strap assemblies 20, 22, manipulation of the manual release assembly (e.g., manual release assembly 84) may allow for the lowering of casket 12 into grave 14 even if no electrical energy is available.

Casket lowering system 10 may include a winding assembly (e.g., winding assembly 88) configured to enable the winding of the plurality of strap assemblies (e.g., strap assemblies 20, 22) around the one or more spool assemblies (e.g., spool assemblies 24, 26). For example, once casket 12 is fully lowered into grave 14, the strap assemblies (e.g., strap assemblies 20, 22) should be rewound onto one or more of the spool assemblies (e.g., spool assemblies 24, 26). Accordingly, winding assembly (e.g., winding assembly 88) may enable such a rewinding operation. The winding assembly (e.g., winding assembly 88) may be configured to be actuated by an electric motor assembly (e.g., electric motor assembly 90) when automated winding is desired. Electric motor assembly 90 may be provided with electrical energy by the rechargeable power source (e.g., rechargeable power source 82). Additionally/alternatively, the winding assembly (e.g., winding assembly 88) may be configured to be actuated by a hand crank assembly (e.g., hand crank assembly 92) when manual winding is desired, which may allow for such rewinding even if no electrical energy is available.

Status Monitoring System

Figure 4:
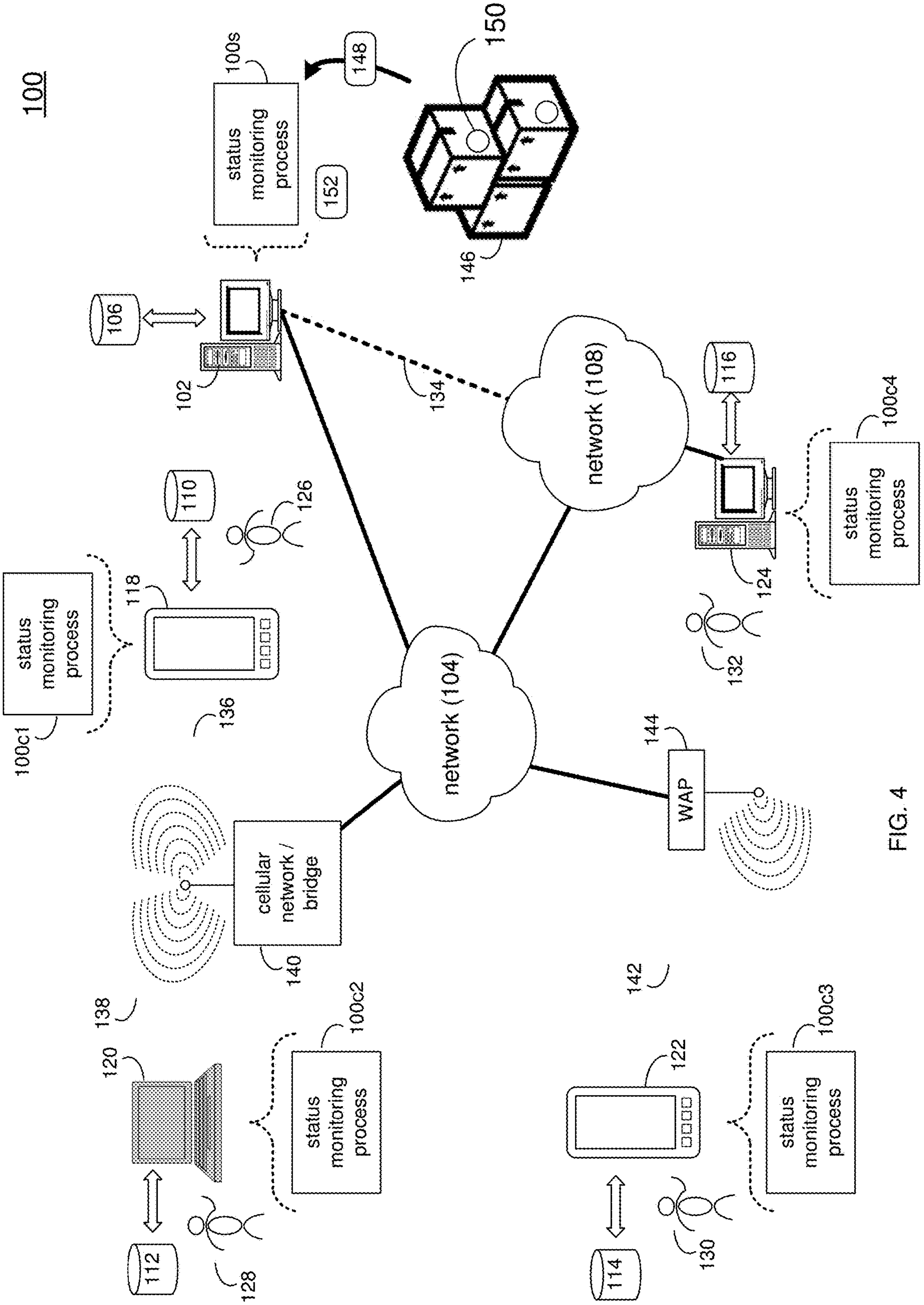
FIG. 4 is a diagrammatic view of a distributed computing network including a computing device that executes a status monitoring process according to an embodiment of the present disclosure.

Referring to FIG. 4, there is shown status monitoring process 100. Status monitoring process 100 may be configured to monitor the status of casket lowering system 10 and/or other mortuary devices (e.g., embalming machine 94).

Status monitoring process 100 may be implemented as a server-side process, a client-side process, or a hybrid server-side/client-side process. For example, status monitoring process 100 may be implemented as a purely server-side process via status monitoring process 100*s*. Alternatively, status monitoring process 100 may be implemented as a purely client-side process via one or more of status monitoring process 100*c*1, status monitoring process 100*c*2, status monitoring process 100*c*3, and status monitoring process 100*c*4. Alternatively still, status monitoring process 100 may be implemented as a hybrid server-side/client-side process via status monitoring process 100*s* in combination with one or more of status monitoring process 100*c*1, status monitoring process 100*c*2, status monitoring process 100*c*3, and status monitoring process 100*c*4. Accordingly, status monitoring process 100 as used in this disclosure may include any combination of status monitoring process 100*s*, status monitoring process 100*c*1, status monitoring process 100*c*2, status monitoring process, and status monitoring process 100*c*4.

Status monitoring process 100*s* may be a server application and may reside on and may be executed by computing device 102, which may be connected to network 104 (e.g., the Internet or a local area network). Examples of computing device 102 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of status monitoring process 100*s*, which may be stored on storage device 106 coupled to computing device 102, may be executed by one or more processors (not shown) and one or more memory architectures (not shown) included within computing device 102. Examples of storage device 106 may include but are not limited to: a hard disk drive; a RAID device; a random-access memory (RAM); a read-only memory (ROM); and all forms of flash memory storage devices.

Network 104 may be connected to one or more secondary networks (e.g., network 108), examples of which may include but are not limited to: a local area network; a wide area network; or an intranet, for example.

Examples of status monitoring processes 100*c*1, 100*c*2, 100*c*3, 100*c*4 may include but are not limited to a client application, a web browser, a game console user interface, or a specialized application (e.g., an application running on e.g., the Android™ platform or the iOS™ platform). The instruction sets and subroutines of status monitoring processes 100*c*1, 100*c*2, 100*c*3, 100*c*4, which may be stored on storage devices 110, 112, 114, 116 (respectively) coupled to client electronic devices 118, 120, 122, 124 (respectively), may be executed by one or more processors (not shown) and one or more memory architectures (not shown) incorporated into client electronic devices 118, 120, 122, 124 (respectively). Examples of storage devices 110, 112, 114, 116 may include but are not limited to: a hard disk drive; a RAID device; a random access memory (RAM); a read-only memory (ROM); and all forms of flash memory storage devices.

Examples of client electronic devices 118, 120, 122, 124 may include, but are not limited to, data-enabled, cellular telephone 118, laptop computer 120, personal digital assistant 122, personal computer 124, a notebook computer (not shown), a server computer (not shown), a gaming console (not shown), a smart television (not shown), and a dedicated network device (not shown). Client electronic devices 118, 120, 122, 124 may each execute an operating system, examples of which may include but are not limited to Microsoft Windows™, Android™, WebOS™, iOS™, Redhat Linux™ or a custom operating system.

Users 126, 128, 130, 132 may access status monitoring process 100 directly through network 104 or through secondary network 108. Further, status monitoring process 100 may be connected to network 104 through secondary network 108, as illustrated with link line 134.

The various client electronic devices (e.g., client electronic devices 118, 120, 122, 124) may be directly or indirectly coupled to network 104 (or network 108). For example, data-enabled, cellular telephone 118 and laptop computer 120 are shown wirelessly coupled to network 104 via wireless communication channels 136, 138 (respectively) established between data-enabled, cellular telephone 118, laptop computer 120 (respectively) and cellular network/bridge 140, which is shown directly coupled to network 104. Further, personal digital assistant 122 is shown wirelessly coupled to network 104 via wireless communication channel 142 established between personal digital assistant 122 and wireless access point (i.e., WAP) 144, which is shown directly coupled to network 104. Additionally, personal computer 124 is shown directly coupled to network 108 via a hardwired network connection.

WAP 144 may be, for example, an IEEE 802.11a, 802.11b, 802.11g, 802.11n, Wi-Fi, and/or Bluetooth device that is capable of establishing wireless communication channel 142 between personal digital assistant 122 and WAP 144. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 5:
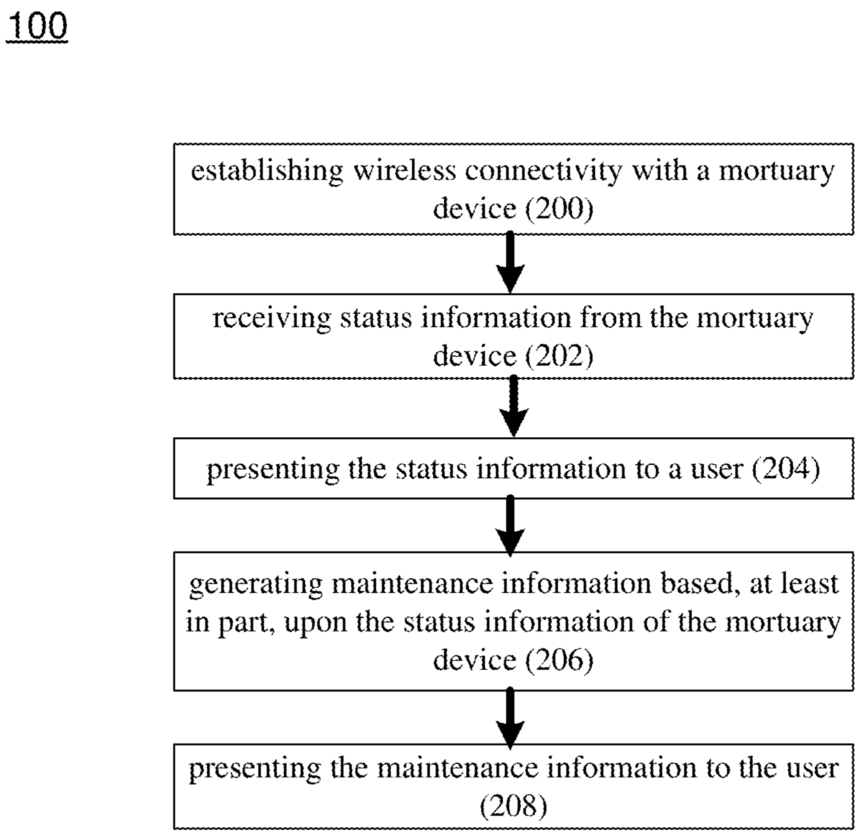
FIG. 5 is a flowchart of an implementation of the status monitoring process of FIG. 4 according to an embodiment of the present disclosure.

Referring also to FIG. 5, status monitoring process 100 may establish 200 wireless connectivity with a mortuary device (e.g., one or more of mortuary devices 146). Examples of mortuary devices 146 may include but are not limited to casket lowering system 10 and embalming machine 94. Status monitoring process 100 may receive 202 status information (e.g., status information 148) from the mortuary device (e.g., one or more of mortuary devices 146) and may present 204 this status information (e.g., status information 148) to a user (e.g., user 126). Assume for this illustrative example that user 126 is an employee of a company that provides/maintains mortuary devices 146. Accordingly, such status information (e.g., status information 148) may be of particular interest to user 126.

In one particular example, this status information (e.g., status information 148) may concern the location of one or more of mortuary devices 146. For example, each of mortuary devices 146 may include a GPS tracking device (e.g., GPS tracking device 150) that provides location information concerning the mortuary device. As is known in the art, a GPS tracking device (e.g., GPS tracking device 150), also known as a GPS tracking unit/a geotracking unit/a tracker, is a navigational device coupled to a vehicle, asset, person or animal that uses the Global Positioning System (GPS) to determine its movement and location. GPS tracking devices (e.g., GPS tracking device 150) may generate location information that may be processed by a receiver. For example, location information may be stored within the GPS tracking device (e.g., GPS tracking device 150) and/or may be transmitted to an Internet-connected device using a cellular network, a WiFi network or satellite network.

Additionally/alternatively, the status information (e.g., status information 148) may concern one or more of: the charge state of the rechargeable power source; the charge cycles of the rechargeable power source; the age of the rechargeable power source; the condition of the rechargeable power source; quantity of lowering cycles of the casket lowering device; and the status of the electrically-actuated brake assembly.

- The Charge State of the Rechargeable Power Source: Status monitoring process 100 may be configured to monitor the state of charge of the rechargeable power source (e.g., rechargeable power source 82) within mortuary devices 146 (e.g., casket lowering system 10 and embalming machine 94). Accordingly, the status information (e.g., status information 148) may inform the user (e.g., user 126) that e.g., rechargeable power source 82 needs to be recharged.
- The Charge Cycles of the Rechargeable Power Source: Status monitoring process 100 may be configured to monitor the quantity of charge cycles of the rechargeable power source (e.g., rechargeable power source 82) within mortuary devices 146 (e.g., casket lowering system 10 and embalming machine 94). Accordingly, the status information (e.g., status information 148) may inform the user (e.g., user 126) that e.g., rechargeable power source 82 has been charged/discharged a number of times that exceeds the anticipated lifespan of rechargeable power source 82.
- The Age of the Rechargeable Power Source: Status monitoring process 100 may be configured to monitor the age of the rechargeable power source (e.g., rechargeable power source 82) within mortuary devices 146 (e.g., casket lowering system 10 and embalming machine 94). Accordingly, the status information (e.g., status information 148) may inform the user (e.g., user 126) that e.g., rechargeable power source 82 has been in use for a period of time that exceeds the anticipated lifespan of rechargeable power source 82.
- The Condition of the Rechargeable Power Source: Status monitoring process 100 may be configured to monitor the condition of the rechargeable power source (e.g., rechargeable power source 82) within mortuary devices 146 (e.g., casket lowering system 10 and embalming machine 94). Accordingly, the status information (e.g., status information 148) may inform the user (e.g., user 126) that e.g., rechargeable power source 82 is no longer capable of being charged to full capacity.
- The Quantity of Lowering Cycles of the Casket Lowering Device: Status monitoring process 100 may be configured to monitor the number of lowering cycles that casket lowering system 10 performed. Accordingly, the status information (e.g., status information 148) may enable the user to make decisions concerning the servicing of wear components (e.g., strap assemblies 20, 22, spool assemblies 24, 26, winding assembly 88, electric motor assembly 90) within casket lowering system 10.
- The Status of the Electrically-Actuated Brake Assembly: Status monitoring process 100 may be configured to monitor the status/condition of the electrically-actuated brake assembly (e.g., electrically-actuated brake assemblies 28, 30 in this illustrative example). Accordingly, the status information (e.g., status information 148) may enable the user to make decisions concerning the servicing of wear components (e.g., rotatable surfaces 52, stationary surfaces 56, mechanical engagement system 60, spring-based mechanical engagement systems 62, 64, electric actuator system 72) within the electrically-actuated brake assembly (e.g., electrically-actuated brake assemblies 28, 30 in this illustrative example).

Status monitoring process 100 may also generate 206 maintenance information (e.g., maintenance information 152) based, at least in part, upon the status information (e.g., status information 148) of mortuary device 146 (e.g., casket lowering system 10, embalming machine 94), wherein status monitoring process 100 may present 208 this maintenance information (e.g., maintenance information 152) to the user (e.g., user 126).

Examples of this maintenance information (e.g., maintenance information 152) may include but are not limited to maintenance recommendations concerning one or more of:

- an electrically-actuated brake assembly (e.g., electrically-actuated brake assemblies 28, 30 in this illustrative example), such as maintenance recommendations concerning the repair/replacement of rotatable surfaces 52, stationary surfaces 56, mechanical engagement system 60, spring-based mechanical engagement systems 62, 64, and/or electric actuator system 72;
- a rechargeable power source (e.g., rechargeable power source 82), such as maintenance recommendations concerning the repair/replacement of rechargeable power source 82; and
- a casket support system (e.g., casket lowering system 10), such as maintenance recommendations concerning the repair/replacement of strap assemblies 20, 22, spool assemblies 24, 26, winding assembly 88, electric motor assembly 90.

When generating 206 maintenance information (e.g., maintenance information 152) based, at least in part, upon the status information (e.g., status information 148) of mortuary device 146 (e.g., casket lowering system 10, embalming machine 94), status monitoring process 100 may utilize machine learning.

As is known in the art, a machine learning system or model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning.

As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent).

As it navigates its problem space, the program is provided feedback that's analogous to rewards, which it tries to maximize. While three examples of machine learning approaches have been provided, it will be appreciated that other machine learning approaches are possible within the scope of the present disclosure.

The maintenance information (e.g., maintenance information 152) generated by status monitoring process 100 may include one or more: maintenance recommendations concerning electrically-actuated brake assemblies 28, 30, rechargeable power source 82 and/or casket lowering system 10; inspection recommendations concerning electrically-actuated brake assemblies 28, 30, rechargeable power source 82 and/or casket lowering system 10; and replacement recommendations concerning electrically-actuated brake assemblies 28, 30, rechargeable power source 82 and/or casket lowering system 10.

Maintenance Recommendations: As discussed above, status monitoring process 100 may generate 206 maintenance information (e.g., maintenance information 152) based, at least in part, upon the status information (e.g., status information 148) of mortuary device 146 (e.g., casket lowering system 10, embalming machine 94). Accordingly and using such a machine learning process, status monitoring process 100 may process status information 148 to identify and extract maintenance patterns/needs. For example, if status monitoring process 100 processes status information 148 and identifies a maintenance pattern of replacing rechargeable power source 82 after every 200 charge/discharge cycles, maintenance information 152 may recommend that the rechargeable power source 82 be replaced every 200 charge/discharge cycles.

Inspection Recommendations: As discussed above, status monitoring process 100 may generate 206 maintenance information (e.g., maintenance information 152) based, at least in part, upon the status information (e.g., status information 148) of mortuary device 146 (e.g., casket lowering system 10, embalming machine 94). Accordingly and using such a machine learning process, status monitoring process 100 may process status information 148 to identify and extract inspection patterns/needs. For example, if status monitoring process 100 processes status information 148 and identifies an inspection pattern of inspecting rotatable surfaces 52 and stationary surfaces 56 after every 50 hours of use, maintenance information 152 may recommend that rotatable surfaces 52 and stationary surfaces 56 be inspected every 50 hours.

Replacement Recommendations: As discussed above, status monitoring process 100 may generate 206 maintenance information (e.g., maintenance information 152) based, at least in part, upon the status information (e.g., status information 148) of mortuary device 146 (e.g., casket lowering system 10, embalming machine 94). Accordingly and using such a machine learning process, status monitoring process 100 may process status information 148 to identify and extract replacement patterns/needs. For example, if status monitoring process 100 processes status information 148 and identifies a replacement pattern of replacing rotatable surfaces 52 and stationary surfaces 56 after every 200 hours of use, maintenance information 152 may recommend that rotatable surfaces 52 and stationary surfaces 56 be replaced every 200 hours. This may be especially true if status monitoring process 100 processes status information 148 and identifies a failure pattern wherein rotatable surfaces 52 and stationary surfaces 56 are very likely to fail after 250 hours of use.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

establishing a wireless connection with a mortuary device, the mortuary device operable to perform a mortuary process and to collect tracking information pertaining to usage of the mortuary device;

receiving from the mortuary device, via the established wireless connection, the tracking information collected by the mortuary device pertaining to usage of the mortuary device; and presenting the tracking information of the mortuary device to a user.

2. The computer-implemented method of claim 1 wherein the tracking information of the mortuary device concerns a location of the mortuary device.

3. The computer-implemented method of claim 1 wherein the mortuary device is powered by a rechargeable power source.

4. The computer-implemented method of claim 3 wherein the tracking information of the mortuary device concerns one or more of: a charge state of the rechargeable power source; charge cycles of the rechargeable power source; an age of the rechargeable power source; and a condition of the rechargeable power source.

5. The computer-implemented method of claim 1 wherein the mortuary device includes an embalming machine.

6. The computer-implemented method of claim 1 wherein the mortuary device includes a casket lowering device.

7. The computer-implemented method of claim 6 wherein the tracking information of the mortuary device concerns a quantity of lowering cycles of the casket lowering device.

8. The computer-implemented method of claim 6 wherein the casket lowering device includes an electrically-actuated brake assembly and the tracking information of the mortuary device concerns a status of the electrically-actuated brake assembly.

9. The computer-implemented method of claim 1 further comprising:

generating maintenance information based, at least in part, upon the tracking information of the mortuary device; and presenting the maintenance information to the user.

10. The computer-implemented method of claim 9 wherein the maintenance information includes one or more of:

maintenance recommendations concerning an electrically-actuated brake assembly;

maintenance recommendations concerning a rechargeable power source; and maintenance recommendations concerning a casket support system.

11. A computer program product residing on a non-transitory computer readable medium having a plurality of instructions stored thereon which, when executed by a processor, cause the processor to perform operations comprising:

establishing a wireless connection with a mortuary device, the mortuary device operable to perform a mortuary process and to collect tracking information pertaining to usage of the mortuary device;

receiving from the mortuary device, via the established wireless connection, the tracking information pertaining to usage of the mortuary device; and presenting the tracking information of the mortuary device to a user.

12. The computer program product of claim 11 wherein the tracking information of the mortuary device concerns a location of the mortuary device.

13. The computer program product of claim 11 wherein the mortuary device is powered by a rechargeable power source.

14. The computer program product of claim 13 wherein the tracking information of the mortuary device concerns one or more of: a charge state of the rechargeable power source; charge cycles of the rechargeable power source; an age of the rechargeable power source; and a condition of the rechargeable power source.

15. The computer program product of claim 11 wherein the mortuary device includes an embalming machine.

16. The computer program product of claim 11 wherein the mortuary device includes a casket lowering device.

17. The computer program product of claim 16 wherein the tracking information of the mortuary device concerns a quantity of lowering cycles of the casket lowering device.

18. The computer program product of claim 16 wherein the casket lowering device includes an electrically-actuated brake assembly and the tracking information of the mortuary device concerns a status of the electrically-actuated brake assembly.

19. The computer program product of claim 11 further comprising:

generating maintenance information based, at least in part, upon the tracking information of the mortuary device; and presenting the maintenance information to the user.

20. The computer program product of claim 19 wherein the maintenance information includes one or more of:

maintenance recommendations concerning an electrically-actuated brake assembly;

maintenance recommendations concerning a rechargeable power source; and maintenance recommendations concerning a casket support system.

21. A computing system including a processor and memory configured to perform operations comprising:

establishing a wireless connection with a mortuary device, the mortuary device operable to perform a mortuary process and to collect tracking information pertaining to usage of the mortuary device;

receiving from the mortuary device, via the established wireless connection, the tracking information collected by the mortuary device pertaining to usage of the mortuary device; and presenting the tracking information of the mortuary device to a user.

22. The computing system of claim 21 wherein the tracking information of the mortuary device concerns a location of the mortuary device.

23. The computing system of claim 21 wherein the mortuary device is powered by a rechargeable power source.

24. The computing system of claim 23 wherein the tracking information of the mortuary device concerns one or more of: a charge state of the rechargeable power source; charge cycles of the rechargeable power source; an age of the rechargeable power source; and a condition of the rechargeable power source.

25. The computing system of claim 21 wherein the mortuary device includes an embalming machine.

26. The computing system of claim 21 wherein the mortuary device includes a casket lowering device.

27. The computing system of claim 26 wherein the tracking information of the mortuary device concerns a quantity of lowering cycles of the casket lowering device.

28. The computing system of claim 26 wherein the casket lowering device includes an electrically-actuated brake assembly and the mortuary device tracking information concerns a status of the electrically-actuated brake assembly.

29. The computing system of claim 21 further comprising:

generating maintenance information based, at least in part, upon the tracking information of the mortuary device; and presenting the maintenance information to the user.

30. The computing system of claim 29 wherein the maintenance information includes one or more of:

maintenance recommendations concerning an electrically-actuated brake assembly;

maintenance recommendations concerning a rechargeable power source; and maintenance recommendations concerning a casket support system.

* * * * *